(12) United States Patent
Hsu

(10) Patent No.: US 7,919,729 B2
(45) Date of Patent: Apr. 5, 2011

(54) HEATING VESSEL

(76) Inventor: Chia-Yi Hsu, Taipei (TW)

( * ) Notice: Subject to any disclaimer, the term of this patent is extended or adjusted under 35 U.S.C. 154(b) by 449 days.

(21) Appl. No.: 11/991,777

(22) PCT Filed: Sep. 7, 2006

(86) PCT No.: PCT/CN2006/002312
§ 371 (c)(1),
(2), (4) Date: Mar. 11, 2008

(87) PCT Pub. No.: WO2007/031008
PCT Pub. Date: Mar. 22, 2007

(65) Prior Publication Data
US 2009/0230116 A1    Sep. 17, 2009

(30) Foreign Application Priority Data

Sep. 12, 2005   (CN) .......................... 2005 1 0098180

(51) Int. Cl.
*F27D 11/00*   (2006.01)
*A47J 27/62*   (2006.01)

(52) U.S. Cl. ........ 219/439; 219/432; 219/433; 219/441; 219/492; 219/494; 99/333; 220/573.1

(58) Field of Classification Search ................... 219/439, 219/432, 433, 441, 492, 494; 99/331, 333; 220/573.1
See application file for complete search history.

(56) References Cited

U.S. PATENT DOCUMENTS
5,727,448 A * 3/1998 Sa .................................. 99/331
* cited by examiner

*Primary Examiner* — Shawntina Fuqua
(74) *Attorney, Agent, or Firm* — Guice Patents PLLC

(57) ABSTRACT

A heating vessel comprises a bottom portion made of conductive material and perimeter wall extending upward from the bottom portion to form a perimeter and covers the vessel such as to form a cavity. The perimeter wall comprises an outer wall and an inner wall, and at least an adiabatic portion defined between the outer wall and the inner wall, which is as an adiabatic layer. The dimension of the inner wall is less than the outer wall. The inner wall is connected to the bottom.

9 Claims, 6 Drawing Sheets

HEATING VESSEL

BACKGROUND OF THE INVENTION

1. Field of the Invention

The present invention relates to a heating vessel, more particularly to a, but not limited to, cookware for cooking food, and especially refers to a cookware that heats food via fluid convection such as water or steam.

2. Description of Related Art

A cookware is now commonly seen and used in our daily life, and a user can place food to be heated or cooked inside the cookware, so a cookware is substantially equipped with dual functions of accommodating and heating food.

Generally speaking, a cookware for heating can be categorized to a shallow pan, e.g. a frying pan, a baking tray and a stir-frying pan, and a deep pan, e.g. a boiling vessel; wherein a shallow pan heats via thermal conduction and a boiling vessel heats via thermal convection.

A steamer, as shown in FIG. 4a, commonly used by Chinese is made by a plurality of layers stacked onto each other and heats food via steam convection. A steam vessel, as shown in FIG. 4b, commonly used by westerns is quipped with a multi-layer structure or a soup-pan-liked cookware provided with a net basket.

Materials used for cookware are various, such as copper, iron, aluminum, glass, ceramic, etc. In recent years, a cookware made of stainless steel has occupied most of the market share, mainly because a stainless steel product has a better appearance and durable in use, and is acid-alkali resistant, easy to clean, and has no health related consideration.

But stainless steel itself has his own disadvantages, stainless steel in fact is not a good thermal conductive material, its thermal conductivity is only 16 w/m.k, 4% of that of copper. To overcome such a disadvantage, many patents have disclosed arts about how to improve the thermal conductivity of stainless steel and how to let a heating surface uniformly being heated. As disclosed in the U.S. Pat. No. 6,267,830, wherein a relatively thick copper core having relatively thin layers of pure aluminum bonded between outer layers of stainless steel for improving thermal conduction and processing property. As disclosed in U.S. Pat. No. 5,064,055, wherein a comparatively thick bottom plate of aluminum is provided at a bottom heating surface for improving thermal conduction and distribution.

The above mentioned arts have improved the disadvantage of poor thermal conductivity of stainless steel, but when used in a cookware with a higher perimeter wall, some shortages still have to be overcome.

A cookware heated by a heater is generally heated from its bottom portion, the art disclosed by the U.S. Pat. No. 5,064, 055 improves thermal conductivity of a base portion made of stainless steel, thermal energy within the cookware is mainly input from the bottom portion; if the content within the cookware is a fluid, the heating is mainly conducted via convection; the vertical wall of the cookware is made of thin stainless steel thus the thermal conduction alongside the vertical wall is not efficient, the heat conducting ability of the thermal convection of the fluid provided in the cookware is relatively higher. But the stainless steel perimeter wall that conducts heat alongside the perimeter wall is thin, the lateral thermal resistance is even smaller due to the thin size, so the thermal energy within the cookware would radiate to outside; when the fluid within the cookware is heating, the thin vertical wall of the cookware becomes a heat sinking device, the heating efficiency within the cookware is therefore reduced, as shown in FIG. 7.

As shown in FIG. 6, a round cookware that the height thereof and the diameter thereof are the same is served as an example; if the radius of the round cookware is r, then the diameter is 2 r, the height is also 2 r, the heating surface B is $\pi r^2$, the area of the perimeter wall of the cookware is $2\pi r$ times 2 r and is equal to $4\pi r^2$. If the heat sinking of the cookware cover is neglected, the heat sinking surface of the perimeter wall is 4 times larger than the heating surface of the bottom portion of the round cookware. Even if the actual situation is more complicated, and may involve the property of the fluid, temperature outside the cookware, the type and the thickness and the surface condition of stainless steel, and the intensity of the thermal source, generally speaking, if the height of the cookware is higher with respect to the diameter of the cookware, the heat sinking condition is more serious, this can be proved by the fact that water in a cookware with higher perimeter wall is harder to reach the boiling point. If the height of the cookware is 1.5 times larger than the diameter of the cookware, the heat sinking surface of the perimeter wall is 6 times larger than the heating surface of the bottom portion of the cookware, in this condition the heat waste is serious and obvious.

If the art disclosed in the U.S. Pat. No. 6,267,830 is adopted, wherein a relatively thick copper core having relatively thin layers of pure aluminum bonded between outer layers of stainless steel; because the good thermal conductivity of the copper layer, the temperature of the copper layer is often higher than that of the fluid inside the cookware, but the outer layer of the cookware is still a negative factor for heat sinking protection; because the temperature outside the cookware is lower than that of inside the cookware, the thermal energy radiated out of the cookware via the perimeter wall is larger than the thermal energy input to the cookware, the thermal energy is therefore wasted, as shown in FIG. 8. So the higher the perimeter wall is, the larger the heat sinking surface is and the more thermal energy is therefore wasted.

The present invention provides a heat adiabatic art that the heat sinking from the perimeter wall of the cookware is prevented and thermal energy is reflected back into the cookware, so the energy efficiency is increased and effects of saving energy and reducing cooking time are achieved. When the energy-saving art provided by the present invention is applied to an electric rice cooker or an electric water heater, the electric rice cooker and the electric water heater can be more compact.

SUMMARY OF THE INVENTION

One object of the present invention is to provide a heating vessel in which thermal energy can be prevented from radiating from the vertical perimeter wall of the heating vessel, so the thermal energy can be more efficiently utilized for cooking food in the heating vessel.

Another object of the present invention is to provide a heating vessel, wherein a conventional heating vessel made of stainless steel is improved so heating efficiency when cooking is increased; comparing to the conventional heating vessel, the heating vessel provided by the present invention keeps the advantages of the conventional heating vessel and the present invention further provides a heating vessel that can reduce more heating time and power consumption comparing to a conventional heating vessel made of the same material.

One another object of the present invention is to provide an art for a conventional electric rice cooker, so the conventional structure of the electric rice cooker that is composed by an inner vessel, an outer vessel and a housing is simplified to an integrated vessel member, so manufacturing process and cost can be reduced.

The present invention relates to a heating vessel, characterized in that a bottom portion is made of conductive material and a dual-layer perimeter wall is made of stainless steel, the perimeter wall extends upwardly from the bottom portion to form a perimeter and covers the vessel such as to form a cavity. The perimeter wall comprises an inner wall and an outer wall, and at least an adiabatic portion defined between the outer wall and the inner wall which is as an adiabatic layer. The dimension of the inner wall is less than that of the outer wall. The inner wall is connected to the bottom portion; wherein the adiabatic portion having at least one interlayer is defined between the inner wall and the outer wall, and the inner wall is connected to the bottom portion; wherein the adiabatic portion is extended upwardly from the top end of the bottom portion to the top end of the perimeter wall; wherein the interlayer is vacuum; wherein an inner lining made of adiabatic materials is provided inside the adiabatic portion; wherein the inner lining made of adiabatic materials and provided inside the adiabatic portion is covered by an air-tight metal foil and is vacuumed; wherein the air-tight metal foil is an aluminum foil; wherein the outer periphery of the adiabatic portion is provided with at least one reinforcing retractable rib; wherein the bottom portion is further provided with a thermal conductive layer; the outer side of the inner wall is provided with a thermal-conductive metal layer from the bottom end to the top end of the inner wall.

BRIEF DESCRIPTION OF THE DRAWINGS

FIG. 3b is a partially enlarged view of FIG. 3a;

DETAILED DESCRIPTION OF THE PREFERRED EMBODIMENT

Figure 1:
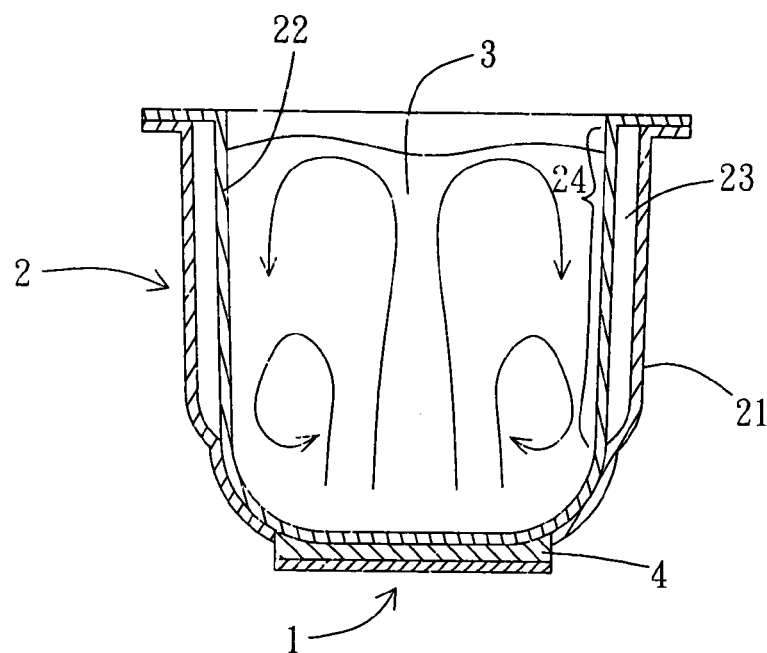
FIG. 1 is a cross sectional view of an embodiment of the present invention.

As shown in FIG. 1, the heating vessel provided by the present invention comprises a bottom portion 1 and a perimeter wall 2 extending upwardly from the bottom portion 1 and covering the heating vessel such as to form a cavity 3, a conventional cover can be provided on the cavity 3.

The bottom portion 1 is made of conductive materials, e.g. but not limited to stainless steel, for directly being heated; in order to lower thermal resistance and unify thermal conduction, a solid interlayer 4 composed by a comparatively thicker plate of copper or aluminum is generally used for auxiliary.

To prevent thermal energy from radiating, the perimeter wall 2 is a dual-layer structure, wherein an outer wall 21 and an inner wall 22 are respectively provided on the perimeter wall 2 and a partition layer 23 is formed between the outer wall 21 and the inner walls 22; as shown in figures, the front and the rear ends of the outer wall 21 and the inner wall 22 are connected and sealed so the partition layer 23 is a sealed space and the partition layer 23 is substantially vacuum, in other words no thermal conductive material is inside; the inner side of the outer wall 21 is a polished and bright plane for reflecting thermal radiation energy. Beside being vacuum, the partition layer 23 can be additionally provided with adiabatic materials, e.g. but not limited to a textilglass, a porous ceramic, as shown in FIG. 2, the section of the perimeter wall 2 having the partition layer 23 is defined as an adiabatic portion 24.

Figure 2:
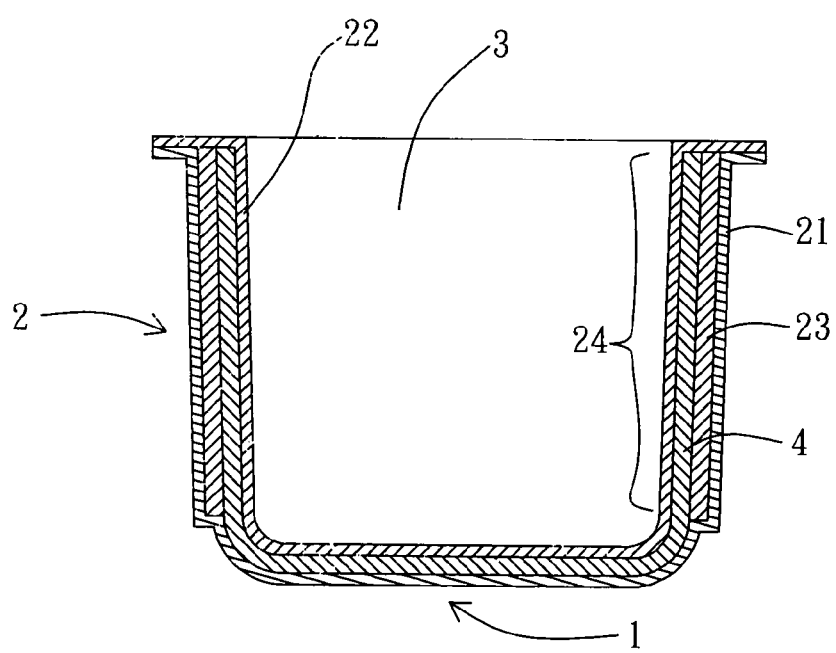
FIG. 2 is a cross sectional view of another embodiment of the present invention.

Referring to FIG. 2, which is another embodiment of the heating vessel provided by the present invention, a copper thermal-conductive layer 4 is provided from the bottom portion 1 and extending upwardly and laminated with the outer end of the inner wall 22, and the partition layer 23 is defined between the outer wall 21 of the adiabatic portion 24 and the thermal-conductive layer 4, the partition layer 23 can be vacuum or additionally provided with a textilglass, a porous ceramic for preventing thermal energy from radiating.

If the embodiments as shown in FIG. 1 and FIG. 2 are applied in a cooking ware, when the bottom portion 1 is heated and the thermal energy is transferred to the cavity 3, a liquid fluid inside the cavity 3 would generate thermal convection; because the thermal energy would not transfer from the inner wall 22 to the outer wall 21, the thermal energy is more efficiently transferred to the cavity 3, the cooking efficiency is therefore increased.

The adiabatic portion 24 mentioned above, in other words the adiabatic portion 24 is defined as the section of the perimeter wall 2 having the partition layers 23, has some technical considerations when applying. If the partition layer 23 is vacuum, there may be a possibility that the partition layer 23 may become concave due to the atmospheric pressure so the strength and the thickness of the material of which the outer wall 21 is made have to be coordinated.

As a daily goods, a cookware is preferably to be light in weight and durable in use so it can be practical and popular, thus a cookware shall not be too heavy, in other words the perimeter wall of a cookware should be reasonably thinner but should be strong enough for sustaining damages due to external impacts or falling so durability is achieved.

Figure 3A:
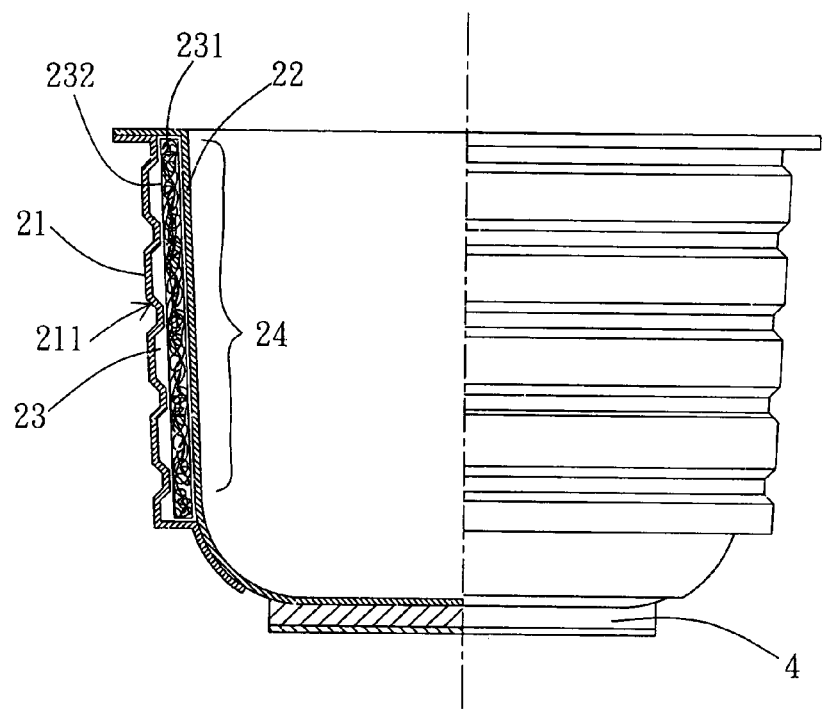
FIG. 3a is a schematic view of a reinforced structure of a vacuum adiabatic portion of a perimeter wall provided by the present invention.
Figure 3B:
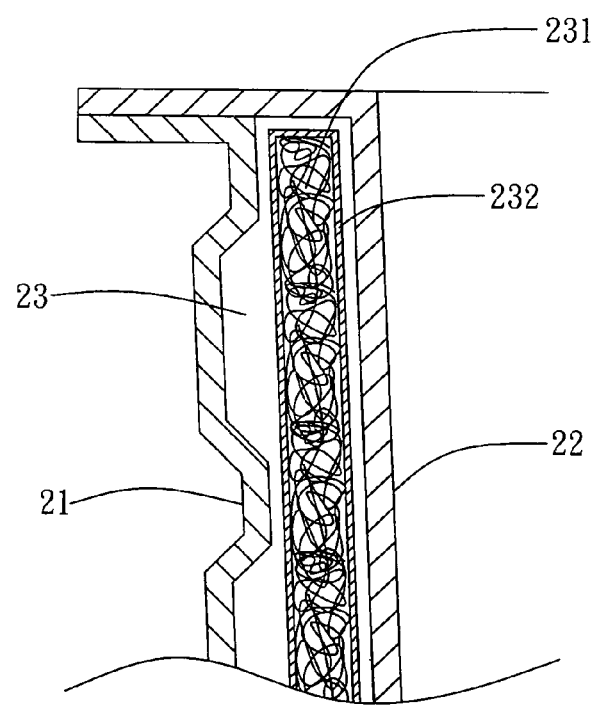
Figure 4A:
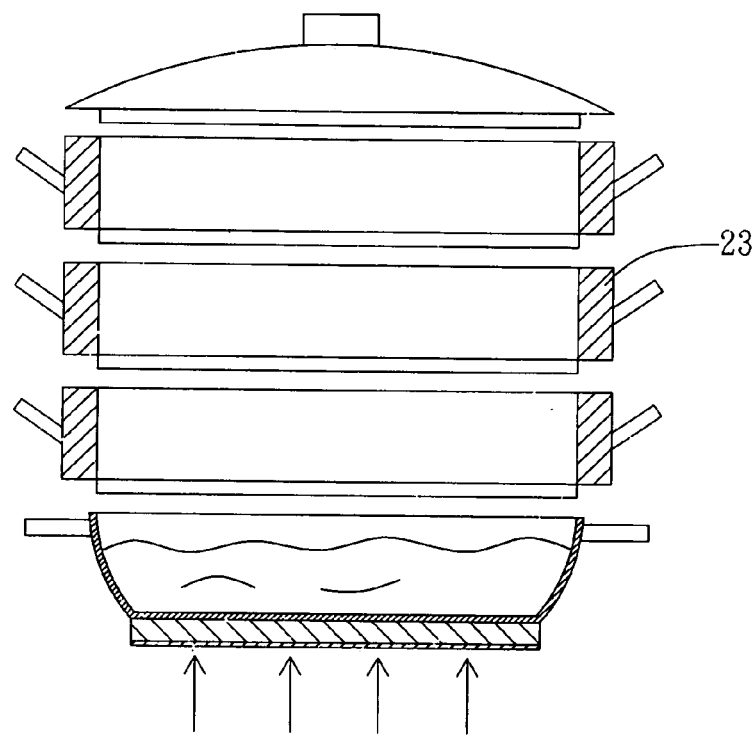
FIG. 4a is a schematic view of a multi-layered steamer of one of the embodiments of the present invention.
Figure 4B:
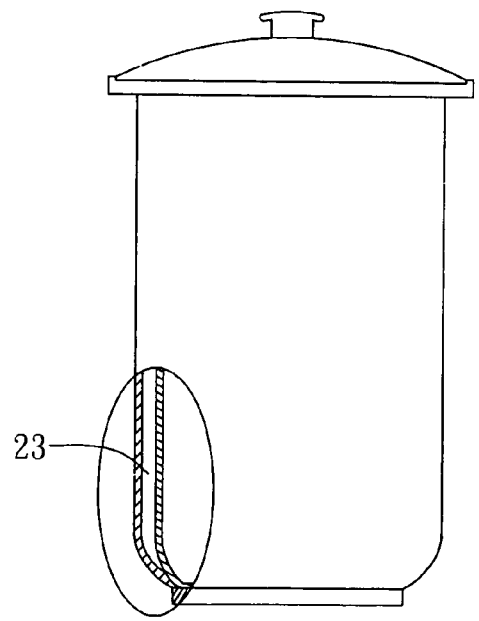
FIG. 4b is schematic view of a multi-layered steamer having a net basket for cooking vegetables and asparagus.

Referring to FIG. 3, a rib-shaped bended structure 211 is provided on the outer wall 21 for enhancing the strength of the outer wall 21 for sustaining the atmospheric pressure and external impacts, an inner lining is provided on the adiabatic portion 24 and the core of the inner lining is made of a porous ceramic paper or a fine textilglass, the outer side of the inner lining is further provided with an aluminum foil and is vacuumed; so the adiabatic material can provide a supporting function and a small vacuum chamber is therefore formed, the inner lining is served to prevent the inner wall 22 and the outer wall 21 from being contact with each other at any time, so no thermal conduction is generated; so even the partition layer 23 of the adiabatic portion 24 is no longer vacuum due to not being used for a long time or any other reason, the energy-saving function of the heating vessel would not lost immediately because an adiabatic vacuum layer is provided in the inner lining.

A proper location of the outer wall 21 can be further provided with a vacuum checking button (not shown), which is in a round shape and convex outwardly, when the partition layer 23 of the adiabatic portion 24 is vacuum, the vacuum checking button is in a concave status due to the atmospheric pressure, when vacuum is lost, the vacuum checking button is in a convex status which indicates the heating vessel shall be repaired.

The rib-shaped structure 211 is in an arc shape or in a ladder shape, and can be design to various compositions according to the material and the thickness of the perimeter wall 2 of the heating vessel and the appearance and cleaning convenience. The rib-shaped structure 211 is served to absorb the deformation formed by the thermal expansion when the heating vessel is abnormally heated, e.g. when the heating vessel is dry heated due to carelessness, so the heating vessel would not be damaged. The aluminum foil covered by the adiabatic inner lining has dual functions, one is a second vacuum layer is formed due to the air tight property of the aluminum foil, so an additional adiabatic protection is therefore provided, even the heating vessel is damaged, the textil-glass or the porous ceramic would not absorb moisture or water, the other function is to provide reflection for the thermal radiation due to the fine surface of the foil, so the thermal radiation is reflected back toward the direction of the inside of the heating vessel. The reason of adopting the aluminum foil in this embodiment is that the aluminum has a good ductility and would be deformed by pressure thus no crack is generated, so the sealing property of the aluminum foil is remained, other materials having similar properties can also be adopted, e.g. a copper foil.

When the heating vessel provided by the present invention is applied as a rice cooker which is a must-have electronic goods for most Asians, the shape and the operating method of the rice cooker will become lighter in weight and more compact. As disclosed in the U.S. Pat. No. 4,241,288, the conventional rice cooker is mainly composed by an inner vessel and an outer vessel, the inner vessel is served to receive rice, water and for cooking, the outer vessel is disposed outside of a housing for receiving the inner vessel and for providing thermal source, a wider interval is formed between the outer vessel and the housing and air within the interval is served for adiabatic purpose, the interval can also be added with other adiabatic materials.

The main theory of the electric rice cooker is that when rice is heated, the rice would absorb water so water within the rice cooker is no longer in movement, when the thermal convection is lost, the temperature of the heating surface of the bottom portion of the rice cooker will raise rapidly to about 130° C., a thermal sensitive switch is therefore released and the heating process is stopped, by this time the rice is not totally cooked yet, the adiabatic function provided by the housing allows the thermal energy remain inside the vessel, thus the rice will be totally cooked after a period of time. The adiabatic function provided by the housing plays an important part in an electric rice cooker.

The heating vessel provided by present invention is not composed by an inner vessel, an outer vessel and a housing for keeping temperature, instead the heating vessel is integrated formed in one piece and all functions can be also achieved.

Figure 5:
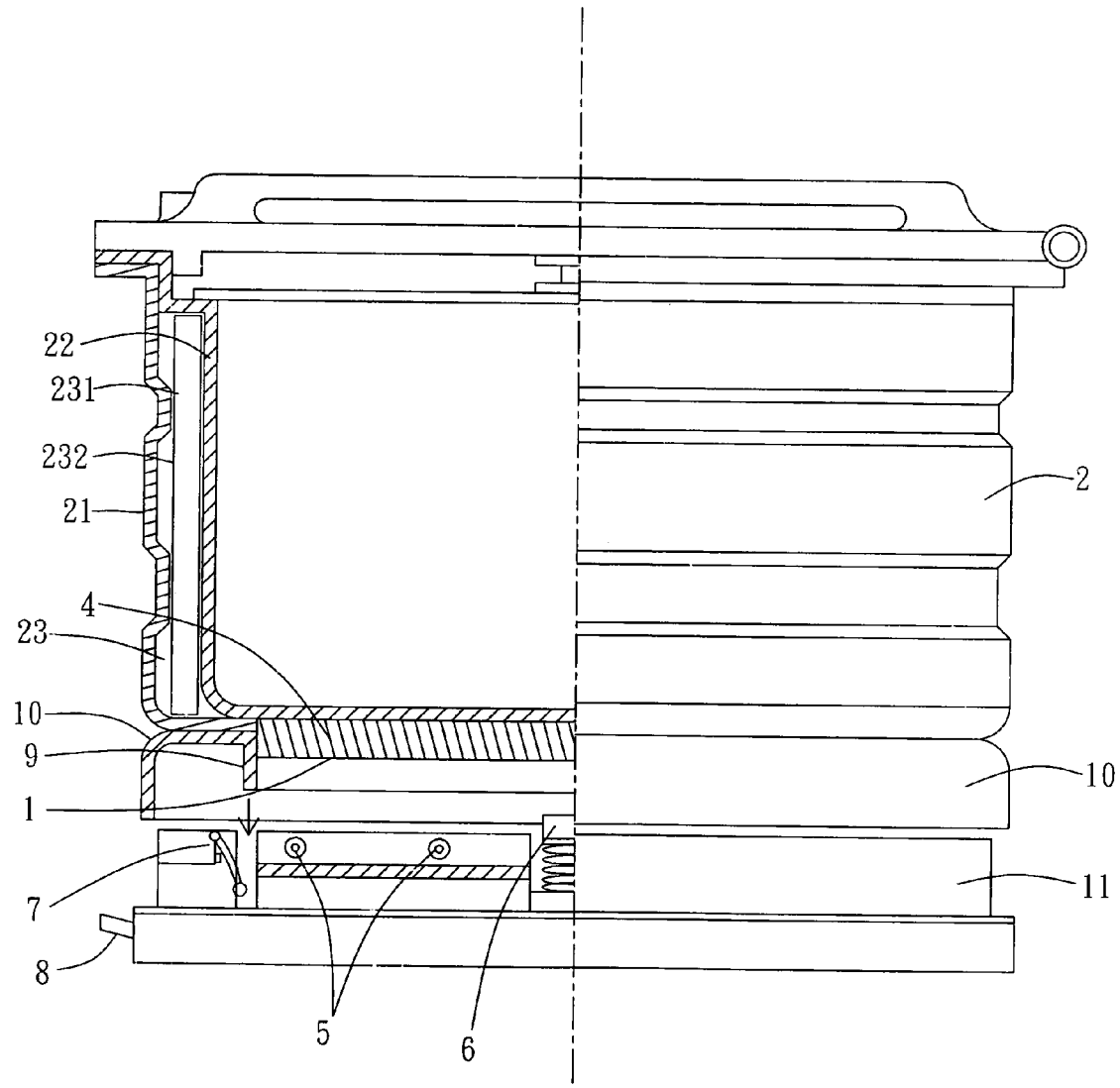
FIG. 5 is a schematic view of an electric rice cooker of one of the embodiments of the present invention.
Figure 6:
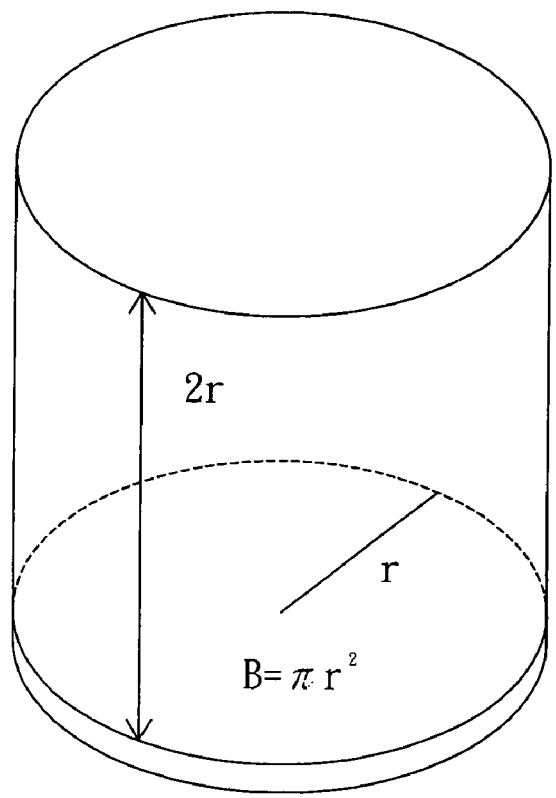
FIG. 6 is a schematic view for illustrating the present invention.
Figure 6:
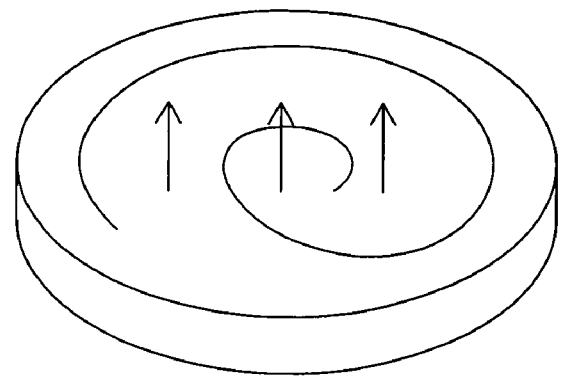
Figure 7:
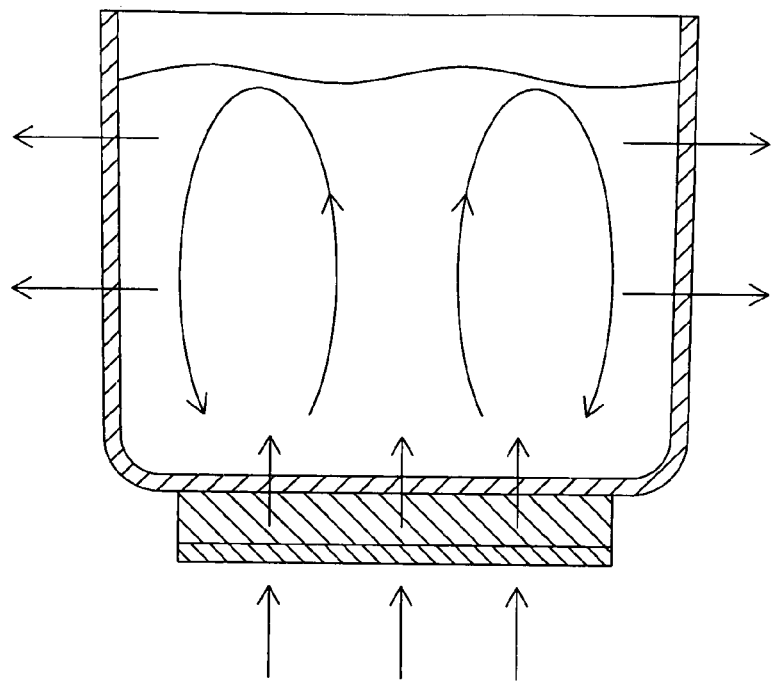
FIG. 7 is a schematic view of a conventional structure in which a bottom portion is served to be heated and thermal energy is transferred by thermal convection.
Figure 8:
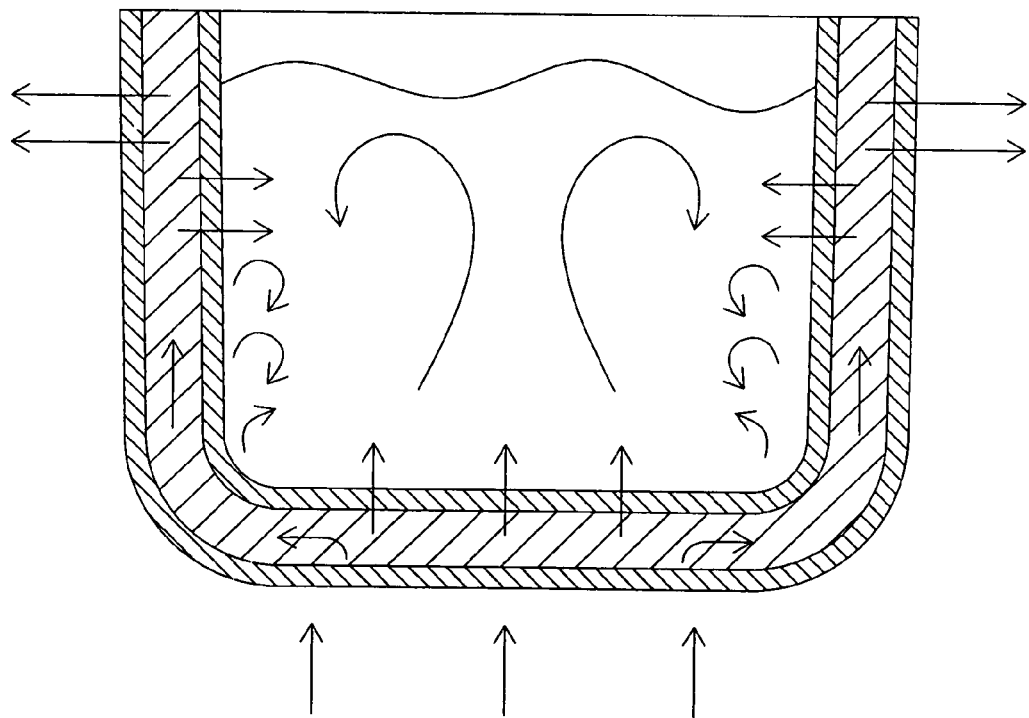
FIG. 8 is a schematic view of a conventional structure in which a bottom portion is served to be heated and the thermal energy is transferred to a perimeter wall by a copper interlayer.

As shown in FIG. 5, the vessel member of the heating vessel is substantially the same as what is shown in FIG. 3, comprises a bottom portion 1, a perimeter wall 2, an inner wall 22, an outer wall 21, an adiabatic layer 231, an aluminum foil cover 232, and a partition layer 23, but a cover that is provided within this figure is very similar to the cover of a conventional electric rice cooker so the cover will not be further discussed hereinafter. A vessel supporting rack 10 connected to the bottom portion 1 of the vessel member is served to allow the vessel stand upright and a non-flowing air layer is thus formed between the bottom portion 1 and the plane where the vessel member is placed so a heat-insulation function is provided, and the thermal energy at the bottom portion 1 is not easily sunk, if the heating vessel is placed on a pad made of adiabatic materials then the temperature-keeping effect will be even better. The inner wall 22, the outer wall 21 and the vessel supporting rack 10 mentioned above are preferably made of stainless steel.

When the heating vessel is placed onto an electric heater 11, a thermal sensitive switch 6 is tightly in contact with the bottom portion 1, and a micro switch 7 is activated by a safety flange 9 provided at the inner side of the vessel supporting rack 10, at this time an electric heating pipe 5 is activated when a switch 8 is pressed, and the bottom portion 1 is then being heated. When the liquid fluid is gone, the temperature would raise rapidly to about 130° C., then power is automatically shut down by the thermal sensitive switch 6 and the electric rice cooker is in a temperature-keeping status which is the same as a conventional rice cooker, but the rice cooker provided in this embodiment has more different appearances and is more durable and easy to clean.

With the above illustrations of the embodiments of the present invention, the heating vessel provided by the present invention has a better thermal efficiency when cooking when compared to a conventional heating vessel, so shortening cooking time and saving energy can be achieved; the present invention also provides an art that a conventional heating vessel composed by an inner vessel and an outer vessel is simplified to an integrated vessel.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heating vessel comprising: a bottom portion made of conductive materials and a dual-layer perimeter wall made of stainless steel, the dual-layer perimeter wall extending upwardly from the bottom portion and forming a perimeter and a cavity, the dual-layer perimeter wall has an outer wall and an inner wall wherein the outer wall is larger than the inner wall, and a adiabatic portion is formed between the inner wall and the outer wall, the adiabatic portion extending from the top end of the bottom portion to the top end of the perimeter wall, the inner wall is connected to the bottom portion; the adiabatic portion having an interlayer located between the inner wall and the outer wall and the inside of the interlayer is vacuum; wherein the interlayer of the adiabatic portion is additionally provided with an inner lining made of adiabatic materials; the outer wall of the dual-layer perimeter wall has at least one reinforced retractable rib located adjacent to the interlayer of the adiabatic portion.

2. The heating vessel as claimed in claim 1, wherein the inner lining provided inside the interlayer of the adiabatic portion is provided with an air-tight metal foil and is vacuumed.

3. The heating vessel as claimed in claim 2, wherein the air-tight metal foil is an aluminum foil.

4. The heating vessel as claimed in claim 1, wherein the bottom portion is further provided with a thermal conductive layer.

5. The heating vessel as claimed in claim 1, wherein the outer side of the inner wall is provided with a thermal conductive metal layer from the bottom end to the top end of the inner wall.

6. An integrated automatic electric rice cooker comprising: an integrated vessel member and an electric heater individually provided, the integrated vessel member is provided with a bottom portion made of thermal conductive materials and a dual-layer perimeter wall made of stainless steel, the dual-layer perimeter wall extending upwardly from the bottom portion and forming a perimeter and a cavity, the dual-layer perimeter wall has an outer wall and an inner wall wherein the outer wall is larger than the inner wall, and a adiabatic portion is formed between the inner wall and the outer wall, the inner wall is connected to the bottom portion; the adiabatic portion having an interlayer located between the inner wall and the outer wall and the inside of the interlayer is vacuum; wherein the interlayer of the adiabatic portion is additionally provided with an inner lining made of adiabatic material; the outer wall of the dual-layer perimeter wall has at least one reinforced retractable rib located adjacent to the interlayer of the adiabatic portion; the bottom portion is provided with a skirt-shaped vessel supporting rack that is in contact with the electric heater so the bottom portion is heated by the electric heater.

7. The integrated automatic electric rice cooker as claimed in claim 6, wherein the interlayer of the adiabatic portion is additionally provided with an inner lining made of adiabatic material and the inner lining is covered by an air-tight metal foil and is vacuumed.

8. The heating vessel as claimed in claim 1, wherein the interlayer has an aluminum foil outer layer covering exterior surfaces of the adiabatic materials.

9. The integrated automatic electric rice cooker as claimed in claim 6, wherein the interlayer has an aluminum foil outer layer covering exterior surfaces of the adiabatic materials.

* * * * *